(12) United States Patent
Aoshima et al.

(10) Patent No.: US 9,931,959 B2
(45) Date of Patent: Apr. 3, 2018

(54) BATTERY CONTROL SYSTEM AND VEHICLE CONTROL SYSTEM

(71) Applicants: HITACHI AUTOMOTIVE SYSTEMS, LTD., Ibaraki (JP); NISSAN MOTOR CO., LTD., Kanagawa (JP)

(72) Inventors: Yoshinori Aoshima, Hitachinaka (JP); Hiroshi Morikawa, Hitachinaka (JP); Masayuki Takada, Hitachinaka (JP); Kenichiro Tsuru, Hitachinaka (JP); Shigeyuki Kiyota, Kanagawa (JP); Yoshiyuki Tanaka, Kanagawa (JP); Toyoki Iguchi, Kanagawa (JP); Hiroaki Hashimoto, Kanagawa (JP); Yasuyuki Takahashi, Kanagawa (JP)

(73) Assignees: Hitachi Automotive Systems, Ltd., Ibaraki (JP); Nissan Motor Co., Ltd., Kanagawa (JP)

( * ) Notice: Subject to any disclaimer, the term of this patent is extended or adjusted under 35 U.S.C. 154(b) by 131 days.

(21) Appl. No.: 14/910,277

(22) PCT Filed: Jul. 25, 2014

(86) PCT No.: PCT/JP2014/069731
§ 371 (c)(1),
(2) Date: Feb. 5, 2016

(87) PCT Pub. No.: WO2015/019873
PCT Pub. Date: Feb. 12, 2015

(65) Prior Publication Data
US 2016/0185248 A1    Jun. 30, 2016

(30) Foreign Application Priority Data

Aug. 9, 2013  (JP) .................................. 2013-166799

(51) Int. Cl.
*B60L 11/00* (2006.01)
*B60W 10/26* (2006.01)
(Continued)

(52) U.S. Cl.
CPC ............. *B60L 11/1862* (2013.01); *B60L 3/00* (2013.01); *B60L 11/18* (2013.01); *H01M 10/42* (2013.01);
(Continued)

(58) Field of Classification Search
None
See application file for complete search history.

(56) References Cited

U.S. PATENT DOCUMENTS

| 3,617,851 A | 11/1971 | Du Puy et al. |
| 2008/0136375 A1 | 6/2008 | Nam et al. |

(Continued)

FOREIGN PATENT DOCUMENTS

| CN | 102457082 A | 5/2012 |
| CN | 102959826 A | 3/2013 |

(Continued)

OTHER PUBLICATIONS

The Extended European Search Report dated Feb. 24, 2017 in the EP Application No. 14835101.8.
(Continued)

*Primary Examiner* — Adam D Tissot
(74) *Attorney, Agent, or Firm* — Volpe and Koenig, P.C.

(57) ABSTRACT

A battery control system connected to a battery, which controls charge/discharge at the battery, includes: a current detection unit that measures a current value by detecting a charge/discharge current flowing through the battery; a voltage detection unit that detects a voltage at the battery; a temperature detection unit that detects a temperature at the battery; an effective current value calculation unit that
(Continued)

calculates, based upon the current value measured by the current detection unit, an effective current value in a predetermined time window; and a charge/discharge restriction unit that imposes a first charge/discharge restriction so as to restrict the charge/discharge current based upon the effective current value calculated by the effective current value calculation unit.

4 Claims, 12 Drawing Sheets

(51) Int. Cl.
  *H02J 7/00*     (2006.01)
  *B60L 11/18*    (2006.01)
  *B60L 3/00*     (2006.01)
  *H01M 10/44*    (2006.01)
  *H01M 10/48*    (2006.01)
  *H01M 10/42*    (2006.01)

(52) U.S. Cl.
  CPC ....... *H01M 10/4257* (2013.01); *H01M 10/44* (2013.01); *H01M 10/48* (2013.01); *H01M 10/486* (2013.01); *H02J 7/00* (2013.01); *H02J 7/0068* (2013.01); *H01M 2010/4271* (2013.01); *H01M 2010/4278* (2013.01)

(56) References Cited

U.S. PATENT DOCUMENTS

| | | |
|---|---|---|
| 2010/0138178 A1 | 6/2010 | Paryani et al. |
| 2011/0270477 A1* | 11/2011 | Ueki ................. H01M 10/0525 701/22 |
| 2012/0091971 A1 | 4/2012 | Syed et al. |
| 2013/0033790 A1 | 2/2013 | Kobayakawa et al. |
| 2013/0098646 A1 | 4/2013 | Funabashi et al. |
| 2013/0140886 A1 | 6/2013 | Bito |
| 2013/0271068 A1 | 10/2013 | Komoda et al. |

FOREIGN PATENT DOCUMENTS

| | | |
|---|---|---|
| EP | 1324456 A1 | 7/2003 |
| EP | 2 323 238 A2 | 5/2011 |
| JP | 2008-024124 A | 2/2008 |
| JP | 2008-312391 A | 12/2008 |
| JP | 2009-207312 A | 9/2009 |
| JP | 2011-229318 A | 11/2011 |
| JP | 2012-013472 A | 1/2012 |
| JP | 2012-044844 A | 3/2012 |
| JP | 2013-027209 A | 2/2013 |
| JP | 2013-051115 A | 3/2013 |
| RU | 127 521 U1 | 4/2013 |
| WO | 2012/081696 A1 | 6/2012 |
| WO | 2013/094057 A1 | 6/2013 |

OTHER PUBLICATIONS

Russian Search Report dated Mar. 23, 2017 in the Russian Application No. 2016103959.

Office Action dated Aug. 14, 2017 issued in CN counterpart application No. 201480044136.0.

Extended European Search Report dated Sep. 13, 2017 issued in EP counterpart application No. 14835101.8.

* cited by examiner

FIG.9

| | CURRENT TIME POINT | ONE HOUR PREVIOUS | TWO HOURS PREVIOUS | THREE HOURS PREVIOUS | FOUR HOURS PREVIOUS | FIVE HOURS PREVIOUS | ... | 23 HOURS PREVIOUS | 24 HOURS PREVIOUS |
|---|---|---|---|---|---|---|---|---|---|
| EXCEED ALLOWABLE VALUE | | | × | | × | × | | × | × |

DECISION-MAKING THRESHOLD VALUE FOR CHANGE-OVER TO SECOND-PHASE RESTRICTION = 5

FIG.10

| | EFFECTIVE CURRENT VALUE FOR 10-MINUTE TIME WINDOW | EFFECTIVE CURRENT VALUE FOR ONE-HOUR TIME WINDOW | SECOND-PHASE RESTRICTION CHANGE-OVER TIME |
|---|---|---|---|
| ALLOWABLE VALUE | 50A | 30A | FIVE HOURS |
| MEASUREMENT VALUE | 55A | 33A | FOUR HOURS |
| | 60A | 36A | THREE HOURS |
| | 65A | 39A | TWO HOURS |
| | 70A | 41A | ONE HOUR |

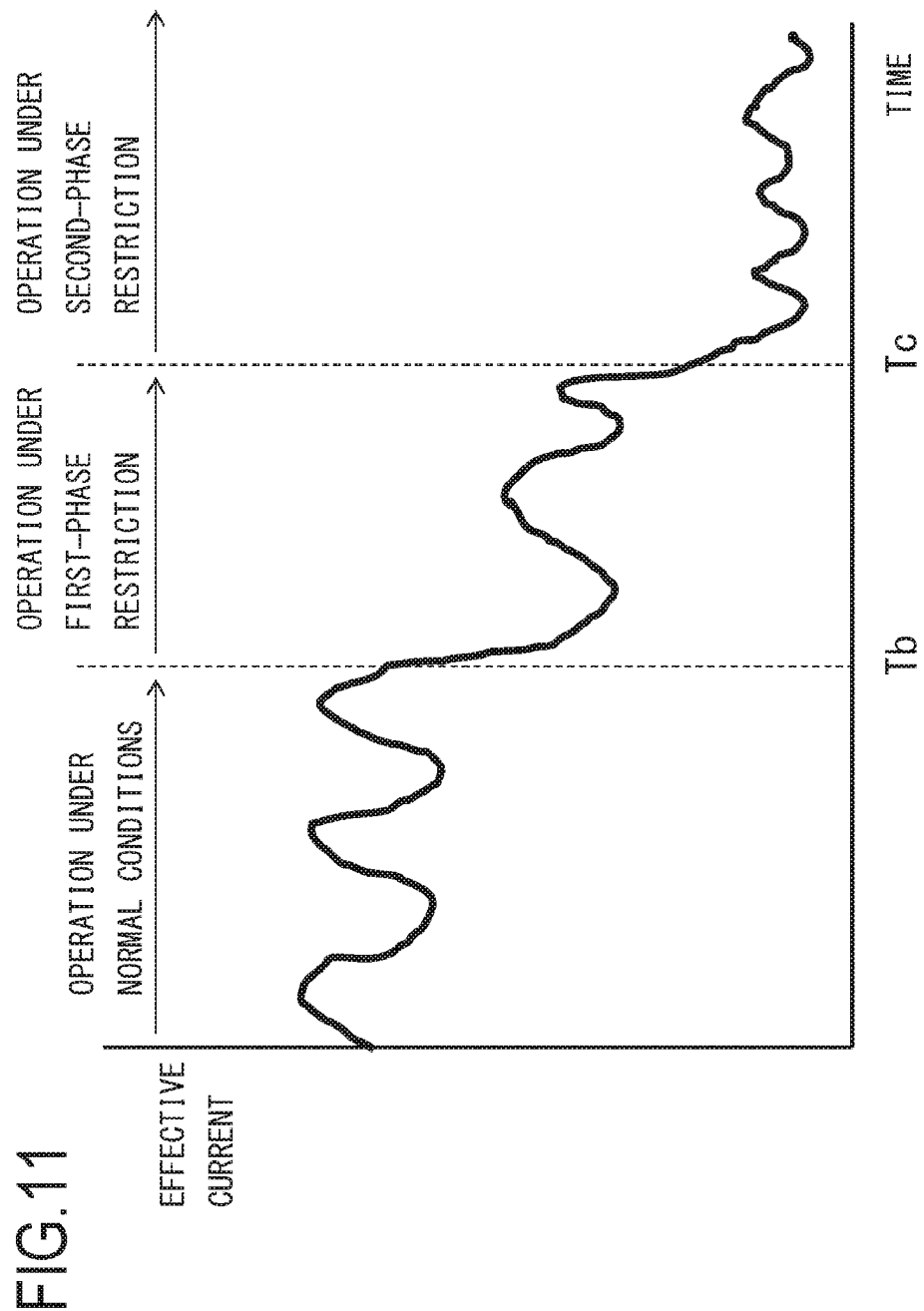

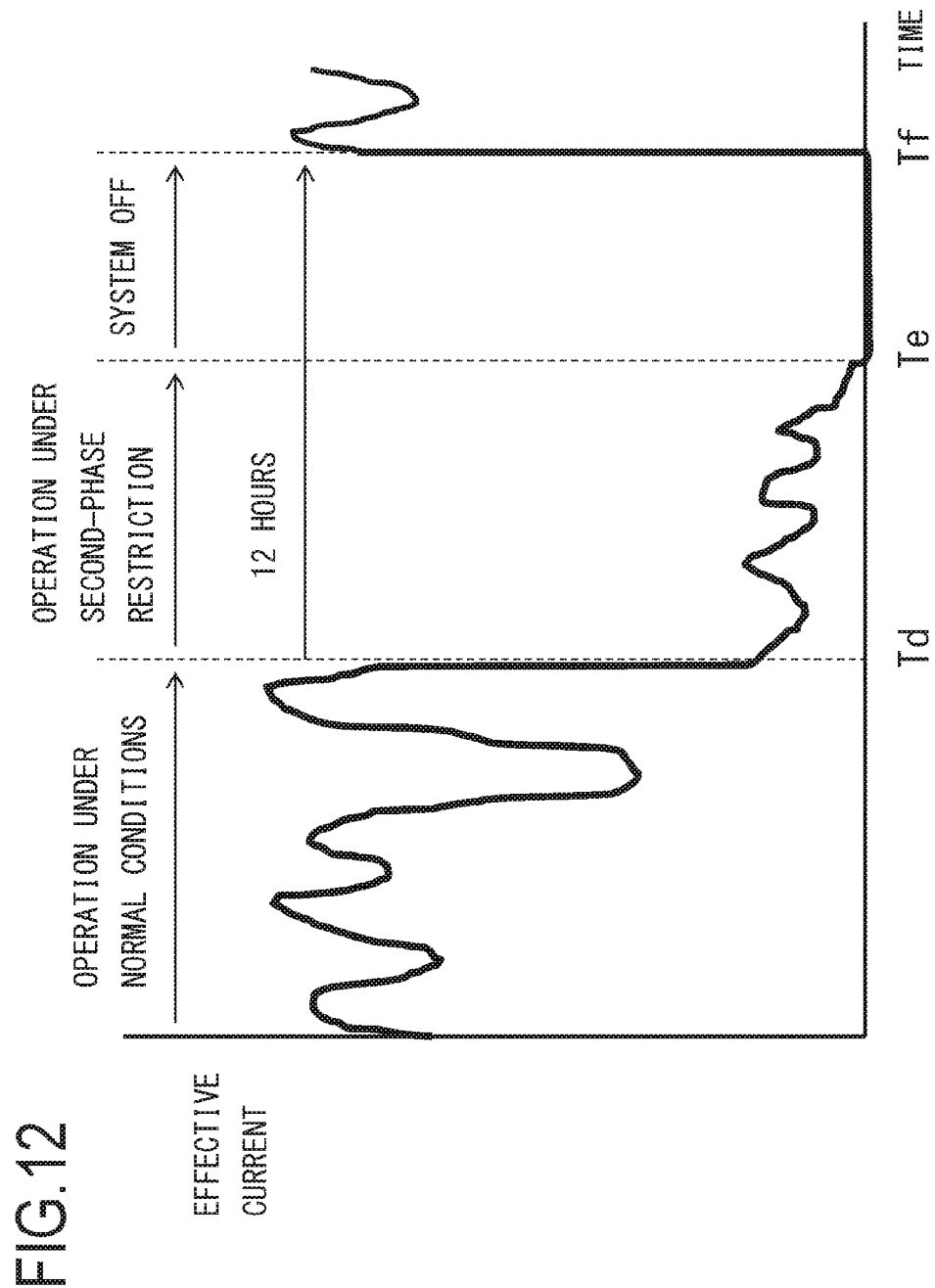

BATTERY CONTROL SYSTEM AND VEHICLE CONTROL SYSTEM

TECHNICAL FIELD

The present invention relates to a battery control system and a vehicle control system.

BACKGROUND ART

When a secondary battery such as a lithium-ion battery has been continuously discharged with a large current, the internal resistance value is bound to temporarily rise in much the same way as the value rises when the battery becomes degraded, and under such circumstances, the battery can no longer perform at its full performance level. PTL1 discloses a battery control method devised to prevent such deterioration in the performance level, whereby an evaluation value, indicating the extent of battery degradation due to continuous battery discharge, is integrated and a restriction is imposed with regard to battery discharge if the integral value exceeds a predetermined allowable value.

CITATION LIST

Patent Literature

PTL1: Japanese Laid Open Patent Publication No. 2013-51115

SUMMARY OF INVENTION

Technical Problem

In the battery control method disclosed in PTL1, an evaluation value indicating the extent of battery degradation is calculated based upon the length of time having elapsed since the previous evaluation value calculation, the level of the discharge current and the like and a decision is made as to whether or not to restrict the battery discharge based upon the integral value obtained by integrating the evaluation value. However, when the battery is kept in a charge/discharge state while the current is continuously changing, the extent of battery degradation cannot be correctly assessed through the evaluation value calculation method described above and thus, a decrease in the battery performance cannot be reliably prevented.

Solution to Problem

According to the 1st aspect of the present invention, a battery control system connected to a battery, which controls charge/discharge at the battery, comprises: a current detection unit that measures a current value by detecting a charge/discharge current flowing through the battery; a voltage detection unit that detects a voltage at the battery; a temperature detection unit that detects a temperature at the battery; an effective current value calculation unit that calculates, based upon the current value measured by the current detection unit, an effective current value in a predetermined time window; and a charge/discharge restriction unit that imposes a first charge/discharge restriction so as to restrict the charge/discharge current based upon the effective current value calculated by the effective current value calculation unit.

According to the 2nd aspect of the present invention, in the battery control system according to the 1st aspect, it is preferred that: the effective current value calculation unit individually calculates a plurality of effective current values in a plurality of time windows different from one another; and the charge/discharge restriction unit imposes the first charge/discharge restriction based upon the plurality of effective current values.

According to the 3rd aspect of the present invention, in the battery control system according to the 1st or the 2nd aspect, it is preferred that: the battery control system further comprises a cumulative time length calculation unit that calculates a cumulative time length expressed as a cumulative value for a length of time over which the effective current value has been in excess of a predetermined allowable value; and the charge/discharge restriction unit imposes a second charge/discharge restriction to further restrict the charge/discharge current based upon the cumulative time length calculated by the cumulative time length calculation unit.

According to the 4th aspect of the present invention, in the battery control system according to the 3rd aspect, it is preferred that the charge/discharge restriction unit sets a threshold value for the cumulative time length in correspondence to the effective current value and imposes the second charge/discharge restriction based upon results obtained by comparing the cumulative time length with the threshold value.

According to the 5th aspect of the present invention, in the battery control system according to the 3rd or the 4th aspect, it is preferred that the charge/discharge restriction unit clears the second charge/discharge restriction once a length of elapsed time since the second charge/discharge restriction came into effect or a total length of time over which the second charge/discharge restriction has been in effect exceeds a predetermined restriction clearance time.

According to the 6th aspect of the present invention, in the battery control system according to the 5th aspect, it is preferred that: the battery control system is connected to an in-vehicle communication network; and the charge/discharge restriction unit obtains information pertaining to the length of elapsed time or the total length of time via the communication network.

According to the 7th aspect of the present invention, a vehicle control system comprises: a battery control system connected to a battery, which controls charge/discharge at the battery; and a vehicle control unit connected with the battery control system, wherein: the battery control system includes a current detection unit that measures a current value by detecting a charge/discharge current flowing through the battery, a voltage detection unit that detects a voltage at the battery, a temperature detection unit that detects a temperature at the battery and an effective current value calculation unit that calculates, based upon the current value measured by the current detection unit, an effective current value in a predetermined time window; and the vehicle control unit issues an instruction for the battery control system so as to impose a first charge/discharge restriction to restrict the charge/discharge current based upon the effective current value calculated by the effective current value calculation unit.

Advantageous Effect of Invention

According to the present invention, a decrease in the battery performance level can be reliably prevented even when the battery is sustained in a charge/discharge state while the charge/discharge current continuously changes.

DESCRIPTION OF EMBODIMENTS

The following is a description of an embodiment of the present invention, given in reference to drawings. The embodiment will be described below in reference to an example of the present invention adopted in a battery system configuring a power source in a hybrid vehicle (HEV).

In addition, while the embodiment will be described by assuming that the present invention is adopted in conjunction with lithium-ion batteries, the present invention may be otherwise adopted in conjunction with nickel hydrogen batteries, lead-acid batteries, electric double layer capacitors or hybrid capacitors. It is to be noted that while the assembled battery in the embodiment described below is configured by connecting battery cells in series, the assembled battery may instead he configured by connecting in series groups of battery cells each comprised of battery cells connected in parallel or the assembled battery may be configured by connecting in parallel groups of battery cells each comprised of battery cells connected in series.

Figure 1:
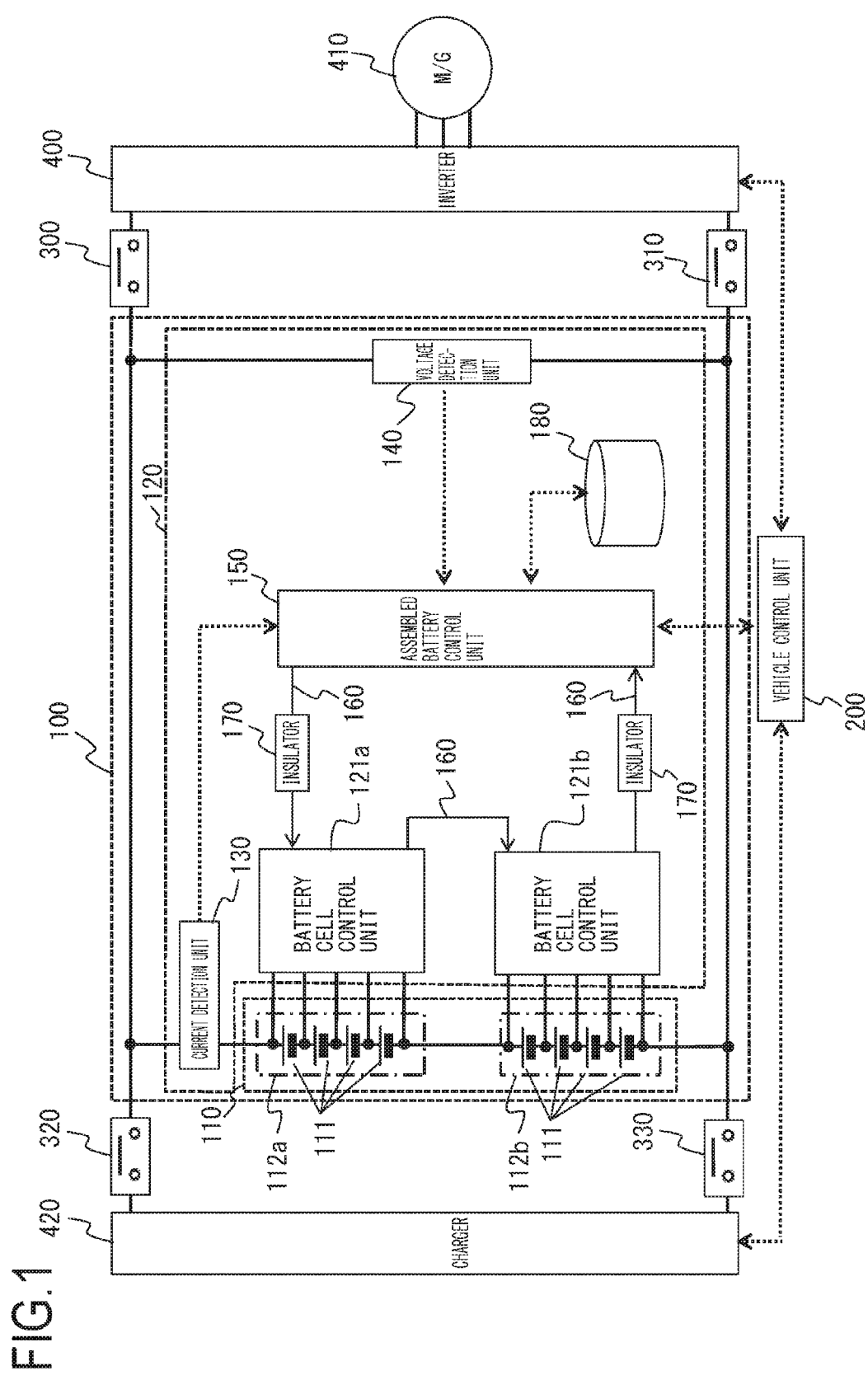
FIG. 1 A diagram showing a configuration comprising a battery system 100 that includes a battery control system 120 achieved in an embodiment of the present invention and peripheral devices FIG. 2 A diagram showing the circuit structure of the battery cell control unit 121a FIG. 3 A diagram presenting an example of a relationship that may be achieved by the time window and the allowable value pertaining to the effective current at a battery FIG. 4 A diagram presenting an example of a relationship that may be achieved by the number of battery operation cycles and the extent of degradation FIG. 5 A diagram showing the control blocks in the assembled battery control unit 150, which are involved in charge/discharge restrictions FIG. 6 A flowchart of the processing executed for the first-phase charge/discharge restriction FIG. 7 A diagram illustrating how the effective current may change when the first-phase charge/discharge restriction is imposed FIG. 8 A flowchart of the processing executed for the second-phase charge/discharge restriction FIG. 9 A chart in reference to which the method for cumulative time length calculation is to be described FIG. 10 A chart in reference to which the method for changeover time setting is to be explained FIG. 11 A diagram illustrating how the effective current may change when the first phase and the second-phase charge/discharge restrictions are imposed FIG. 12 A diagram illustrating how the effective current may change when the second-phase charge/discharge restriction is cleared

FIG. 1 is a diagram showing a configuration comprising a battery system 100 that includes a battery control system 120 achieved in an embodiment of the present invention and peripheral devices. The battery system 100 is connected to an inverter 400 via relays 300 and 310. The battery system 100 comprises an assembled battery (battery pack) 110 and the battery control system 120. The battery control system 120 includes battery cell control units 121a and 121b, a current detection unit 130, a voltage detection unit 140, an assembled battery control unit 150 and a storage unit 180.

The assembled battery 110 is configured by connecting in series battery cell groups 112a and 112b each made up with a plurality of battery cells 111. The battery cell control units 121a and 121b, which are respectively connected with the battery cell groups 112a and 112b, detect the cell voltages (voltages across the individual battery cells) and temperatures at the individual battery cells 111 in the corresponding battery cell groups and transmit signals indicating detection results to the assembled battery control unit 150 via signal communication paths 160 and insulator elements 170. It is to be noted that the insulator elements 170 may be constituted with, for instance, photo-couplers.

The current detection unit 130 detects the current flowing through the assembled battery 110 and measures the value of the current. The voltage detection unit 140 detects the voltage across the assembled battery 110, i.e., the voltage representing the total sum of the voltages at the battery cells 111 connected in series in the assembled battery 110.

Based upon the signals transmitted from the battery cell control units 121a and 121b, the assembled battery control unit 150 obtains the cell voltages and the temperatures at the individual battery cells 111. In addition, it individually receives the current value measured for the current flowing through the assembled battery 110 from the current detection unit 130 and the total voltage value for the assembled battery 110 from the voltage detection unit 140. Based upon the information thus received, the assembled battery control unit 150 detects conditions at the assembled battery 110 and controls the assembled battery 110 accordingly. The detection results indicating the conditions of the assembled battery 110 detected by the assembled battery control unit 150 are transmitted to a vehicle control unit 200 and to the battery cell control units 121a and 121b.

The assembled battery 110 is configured by electrically connecting in series a plurality of battery cells 111 capable of accumulating and releasing electric energy (capable of charging/discharging DC power). In order to facilitate management and control of the conditions at the battery cells 111 configuring the assembled battery 110, the battery cells 111 are divided into groups each made up with a predetermined unit number of cells. The battery cells 111 in each group are electrically connected in series and form the battery cell group 112a or 112b. It is to be noted that all the battery cell groups 112 may be made up with a uniform number of battery cells 111, or the number of battery cells 111 in a given battery cell group 112 may be different from the number of battery cells 111 in another battery cell group 112. For purposes of simplification, the embodiment will be described by assuming that the battery cell groups 112a and 112b, each formed by electrically connecting four battery cells 111 in series are electrically connected in series in the assembled battery 110 having a total of eight battery cells 111 as illustrated in FIG. 1.

The communication method adopted to enable the assembled battery control unit 150 to communicate with the battery cell control units 121a and 121b will be described next. The battery cell control units 121a and 121b are connected in series in an order conforming to the order in which the potentials at the battery cell groups 112a and 112b, respectively monitored by them, shift from high to low. A signal transmitted from the assembled battery control unit 150 is input to the battery cell control unit 121a via an insulator element 170 and a signal communication path 160. An output from the battery cell control unit 121a is input to the battery cell control unit 121b via a signal communication path 160. An output from the lowest-order battery cell control unit 121*b* is transmitted to the assembled battery control unit 150 via an insulator element 170 and a signal communication path 160. It is to be noted that while no insulator element is disposed between the battery cell control unit 121*a* and the battery cell control unit 121*b* in the embodiment, signals may be transmitted/received between these battery cell control units via an insulator element as well.

Various types of information required by the assembled battery control unit 150 for control of the assembled battery 110 are stored and held in the storage unit 180. For instance, information related to the state of charge (SOC) of each battery cell 111, information related to the internal resistance in each battery cell 111 and the like are stored in the storage unit 180.

The assembled battery control unit 150 executes various types of processing and arithmetic operations in order to control the assembled battery 110 by using information individually received from the battery cell control units 121*a* and 121*b*, the current detection unit 130, the voltage detection unit 140 and the vehicle control unit 200, the information stored in the storage unit 180 and the like. It executes, for instance, an arithmetic operation to determine the SOC or the state of health (SOH) of each battery cell 111, an arithmetic operation to determine the allowable power that can be charged/discharged at the assembled battery 110, decision-making with regard to any abnormality in the assembled battery 110 and an arithmetic operation for purposes of charge/discharge quantity control at the assembled battery 110. Then, based upon the arithmetic operation results, it outputs information needed for control of the assembled battery 110 to the vehicle control unit 200 and to the battery cell control units 121*a* and 121*b*. It is to be noted that the assembled battery control unit 150 and the vehicle control unit 200 are both connected to an in-vehicle communication network referred to as a CAN (controller area network) and are thus able to transmit/receive information to/from each other via the network.

The vehicle control unit 200 controls the inverter 400 connected to the battery system 100 via the relays 300 and 310 by using the information transmitted thereto from the assembled battery control unit 150. While the vehicle is in a traveling state, the battery system 100 is connected to the inverter 400. The inverter 400 drives a motor generator 410 with the energy stored in the assembled battery 110 in the battery system 100.

When the vehicle system, having the battery system 100 installed therein, is started up and enters a traveling state, the battery system 100 becomes connected to the inverter 400 under management executed by the vehicle control unit 200. The inverter 400 then uses energy stored in the assembled battery 110 to drive the motor generator 410. In a regenerative operation, on the other hand, the assembled battery 110 is charged with power generated at the motor generator 410.

As the battery system 100 becomes connected to a charger 420 via relays 320 and 330, the assembled battery 110 is charged with a charge current provided from the charger 420 until a predetermined condition is satisfied. The energy stored in the assembled battery 110 through the charge operation is utilized when the vehicle is next engaged in traveling operation and is also utilized for operation of electric components and the like installed at the interior and exterior of the vehicle. Furthermore, the energy may be released into an external power system, a typical example of which is a home power system, as necessary. It is to be noted that the charger 420 is installed in an external power system, typical examples of which include a home power system and a public charging station. As the vehicle, having installed therein the battery system 100, is connected to any of these power systems, the battery system 100 and the charger 420 become connected based upon information provided by the vehicle control unit 200.

Figure 2:
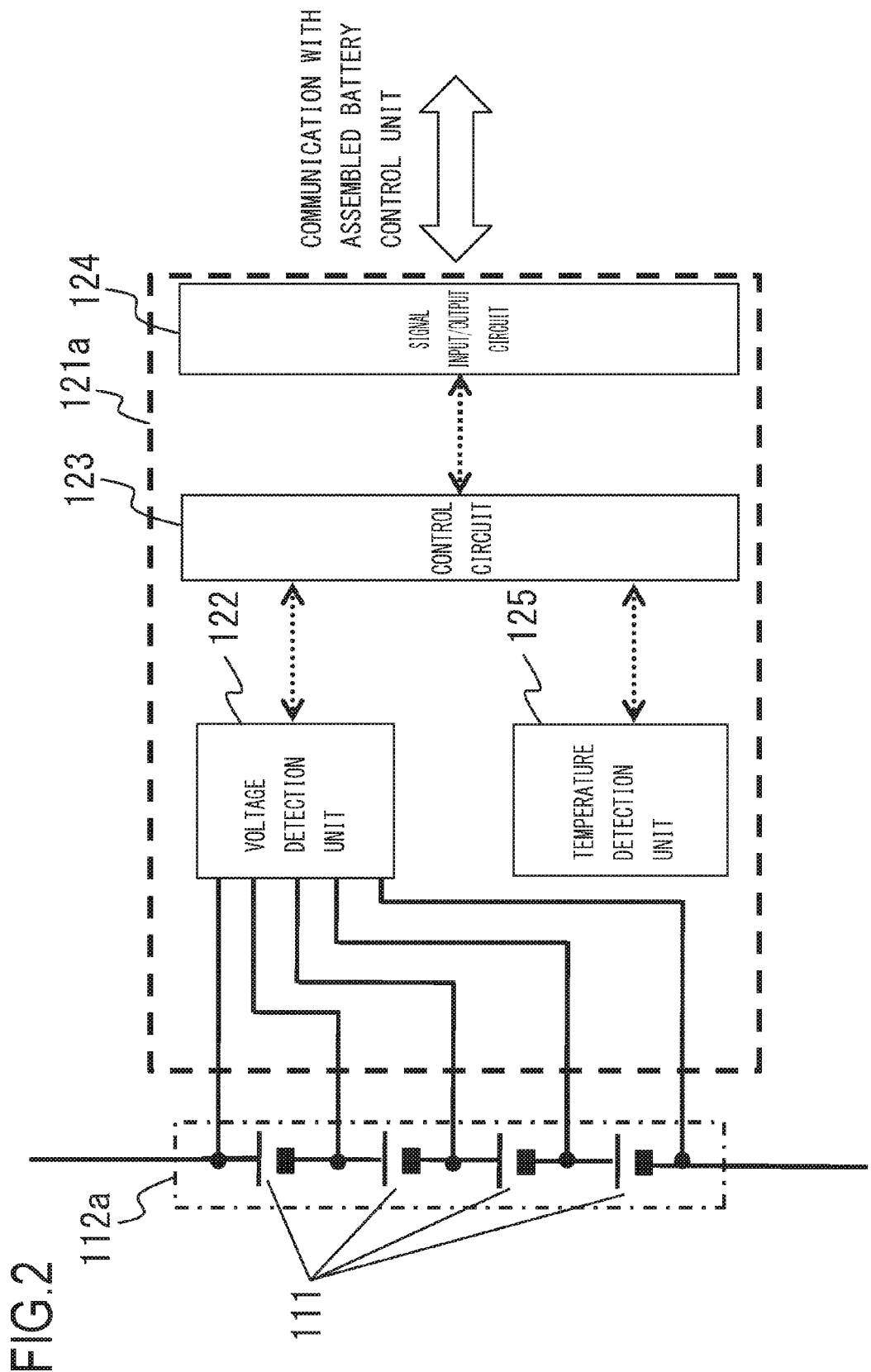

FIG. 2 is a diagram illustrating the circuit structure in the battery cell control unit 121*a*. As FIG. 2 shows, the battery cell control unit 121*a* comprises a voltage detection unit 122, a control circuit 123, a signal input/output circuit 124 and a temperature detection unit 125. It is to be noted that the battery cell control unit 121*a* and the battery cell control unit 121*b* in FIG. 1 assume circuit structures similar to each other. For this reason, the circuit structure in the battery cell control unit 121*a* alone is shown as a representative example in FIG. 2.

The voltage detection unit 122 measures the voltage between the terminals at each battery cell 111 (the voltage across each battery cell). The control circuit 123 receives the measurement results provided by the voltage detection unit 122 and the temperature detection unit 125 and transmits the measurement results thus received to the assembled battery control unit 150 via the signal input/output circuit 124. It is to be noted that although not shown in FIG. 2, the battery cell control unit 121*a* includes an equalizer circuit component of the known art that is used to minimize the variance among voltages and states of charge at the individual battery cells 111, attributable to self discharge, differences in the level of current consumed and the like. The operation of this circuit is controlled by the control circuit 123.

The temperature detection unit 125 in FIG. 2 has a function of measuring the temperature in the battery cell group 112*a*. The temperature detection unit 125 measures a single temperature for the entire battery cell group 112*a* and uses the temperature thus measured as a representative temperature value for the temperatures at the individual battery cells 111 forming the battery cell group 112*a*. The temperature measurement results provided by the temperature detection unit 125 are used for various types of arithmetic operations executed in the assembled battery control unit 150 in order to detect the states of the battery cells 111, the battery cell group 112*a* and the assembled battery 110. The temperature measured by the temperature detection unit 125 is used as the temperature at the individual battery cells 111 in the battery cell group 112*a*, as well as the temperature of the battery cell group 112*a*. In addition, the temperature of the assembled battery 110 may be determined by the assembled battery control unit 150 by, for instance, averaging the temperature of the battery cell group 112*a* measured by the temperature detection unit 125 in the battery cell control unit 121*a* and the temperature of the battery cell group 112*b* measured by the temperature detection unit 125 in the battery cell control unit 121*b*.

It is to be noted that FIG. 2 shows a single temperature detection unit 125 installed in the battery cell control unit 121*a*. However, the present invention is not limited to this example and a temperature detection unit 125 may be disposed in correspondence to each battery cell 111 so as to measure the temperature at the particular battery cell 111 and enable the assembled battery control unit 150 to execute various types of arithmetic operations based upon the measurement results corresponding to the individual battery cells. However, it must be borne in mind that a greater number of temperature detection units 125 in this alternative is bound to complicate the structure of the battery cell control unit 121a. As a further alternative, a single temperature detection unit 125 may be installed for the entire assembled battery 110.

It is to be noted that while the temperature detection unit 125 is shown as a single block for schematic representation in FIG. 2, a temperature sensor is installed in conjunction with the battery cell group 112a, i.e., the temperature measurement target, and this temperature sensor outputs the temperature information as a voltage signal in the actual configuration. The control circuit 123 executes an arithmetic operation to determine the temperature of the battery cell group 112a based upon the voltage signal and temperature measurement results for the battery cell group 112a are thus obtained. The temperature measurement results of the arithmetic operation executed by the control circuit 123 are transmitted to the signal input/output circuit 124, which, in turn, outputs the temperature measurement results to a recipient outside the battery cell control unit 121a. The function enabling this flow of processing is included as the temperature detection unit 125 in the battery cell control unit 121a. It is to be noted that the voltage signal output from the temperature sensor may be measured by the voltage detection unit 122 instead.

Figure 3:
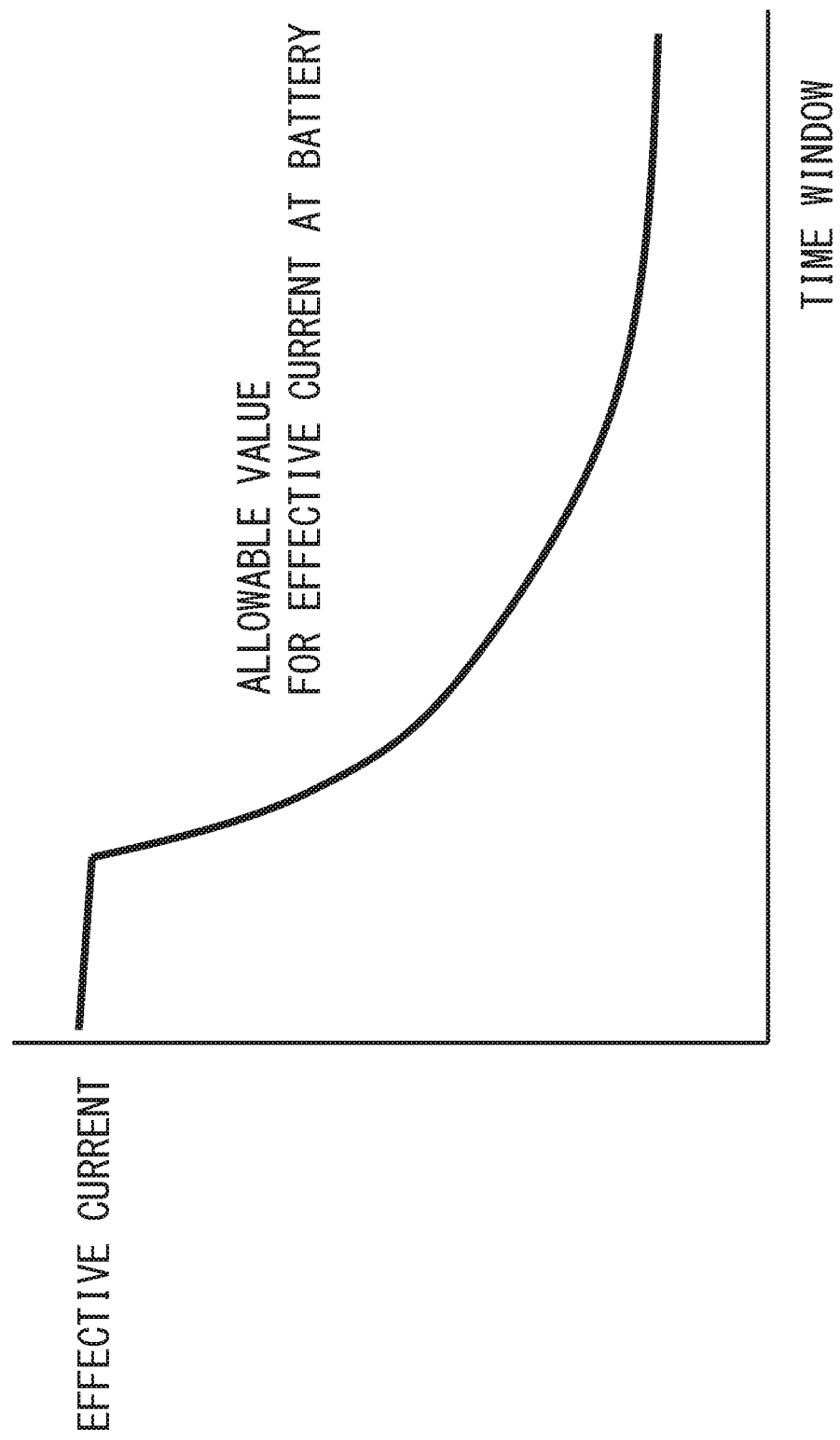

Next, charge/discharge restrictions that may be imposed on the assembled battery 110 will be described. FIG. 3 presents an example of a relationship that may be achieved by the time window and the allowable value pertaining to the effective current (root mean square current) at a standard battery. As shown in FIG. 3, the allowable value for the effective current at the battery changes in correspondence to the time window set for effective current calculation. Namely, as the time window for effective current calculation extends, the allowable value needs to be set lower since the battery tends to become further degraded through a longer time window.

Figure 4:
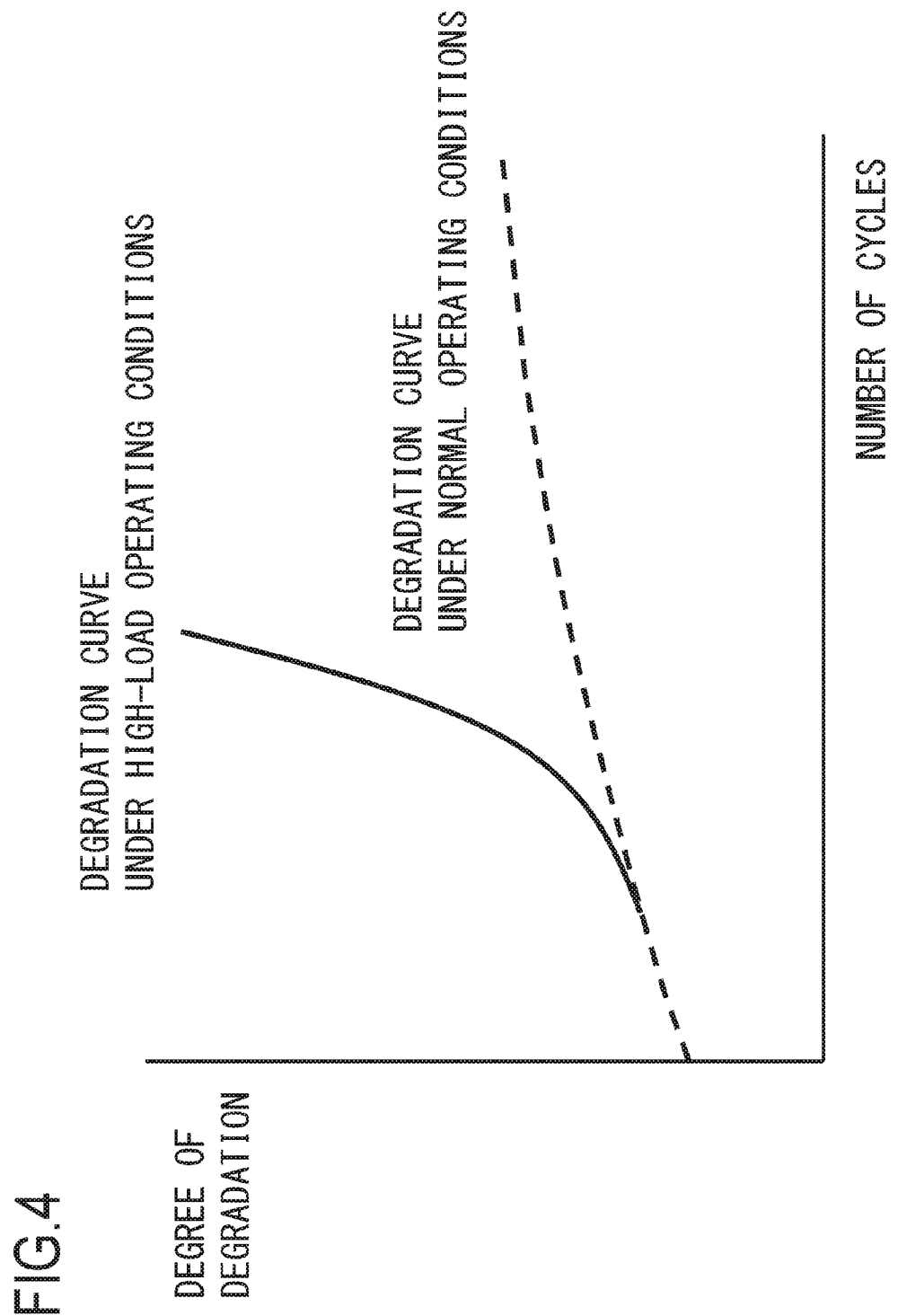

FIG. 4 presents an example of a relationship that may be achieved by the number of battery operation cycles and the extent of degradation. As indicated by the dotted line in FIG. 4, the battery becomes gradually degraded as the number of battery operation cycles increases as long as the effective current remains equal to or less than the allowable value under normal operating conditions. When the battery is used under high-load conditions with the effective current exceeding the allowable value, the internal resistance value temporarily spikes as the number of battery operation cycles increases and thus, the battery appears to become degraded rapidly, as indicated by the solid line in FIG. 4. Under the latter circumstances, the battery can no longer operate at its full performance level.

Accordingly, when the assembled battery 110 is continuously charged/discharged with a relatively large charge/discharge current, the assembled battery control unit 150 in the battery control system 120 achieved in the embodiment imposes charge/discharge restrictions so as to prevent any decrease in the performance level of the assembled battery 110. These charge/discharge restrictions will be described in detail next.

Figure 5:
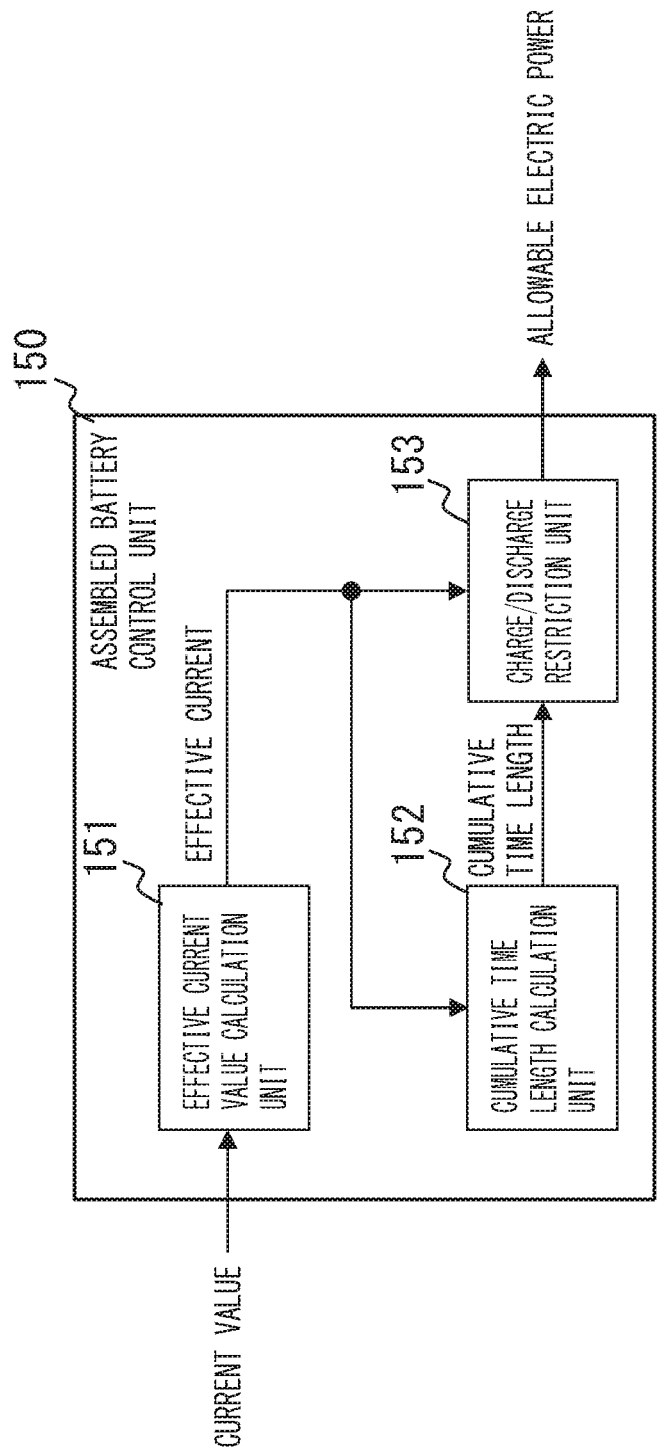

FIG. 5 is a diagram showing the control blocks in the assembled battery control unit 150. The assembled battery control unit 150, which are involved in the charge/discharge restrictions, includes the following functional control blocks; an effective current value calculation unit 151, a cumulative time length calculation unit 152 and a charge/discharge restriction unit 153, as structural elements for enabling the charge/discharge restrictions at the assembled battery 110.

The current value for the charge/discharge current at the assembled battery 110, measured by the current detection unit 130, is input to the effective current value calculation unit 151. Based upon the current value input thereto, the effective current value calculation unit 151 calculates an effective current value for the charge/discharge current flowing through the assembled battery 110. The method adopted for the effective current value calculation will be described later in detail. The effective current value calculated by the effective current value calculation unit 151 is output to the cumulative time length calculation unit 152 and the charge/discharge restriction unit 153.

The cumulative time length calculation unit 152 compares the effective current value output by the effective current value calculation unit 151 with a predetermined allowable value and determines a cumulative value (cumulative time length) with regard to the length of time over which the effective current value has been in excess of the allowable value. The cumulative time length calculated by the cumulative time length calculation unit 152 is output to the charge/discharge restriction unit 153.

The charge/discharge restriction unit 153 makes a decision, based upon the effective current value output by the effective current value calculation unit 151 and the cumulative time length output by the cumulative time length calculation unit 152, as to whether or not to restrict the charge/discharge current at the assembled battery 110. Upon deciding that the charge/discharge current is to be restricted, it determines an allowable power value corresponding to the restricted charge/discharge current and outputs the value thus determined to the vehicle control unit 200 and to the battery cell control units 121a and 121b. Through this process, charge/discharge restriction is imposed and the charge/discharge current at the assembled battery 110 is thus regulated.

The control blocks described above enable the assembled battery control unit 150 to impose charge/discharge restrictions over two phases at the assembled battery 110. In more specific terms, a charge/discharge restriction is imposed as a first-phase charge/discharge restriction when the effective current value exceeds the predetermined allowable value. In addition, a further charge/discharge restriction is imposed as a second-phase charge/discharge restriction when the cumulative value representing the cumulative length of time over which the effective current value has been in excess of the predetermined allowable value exceeds a predetermined threshold value.

Figure 6:
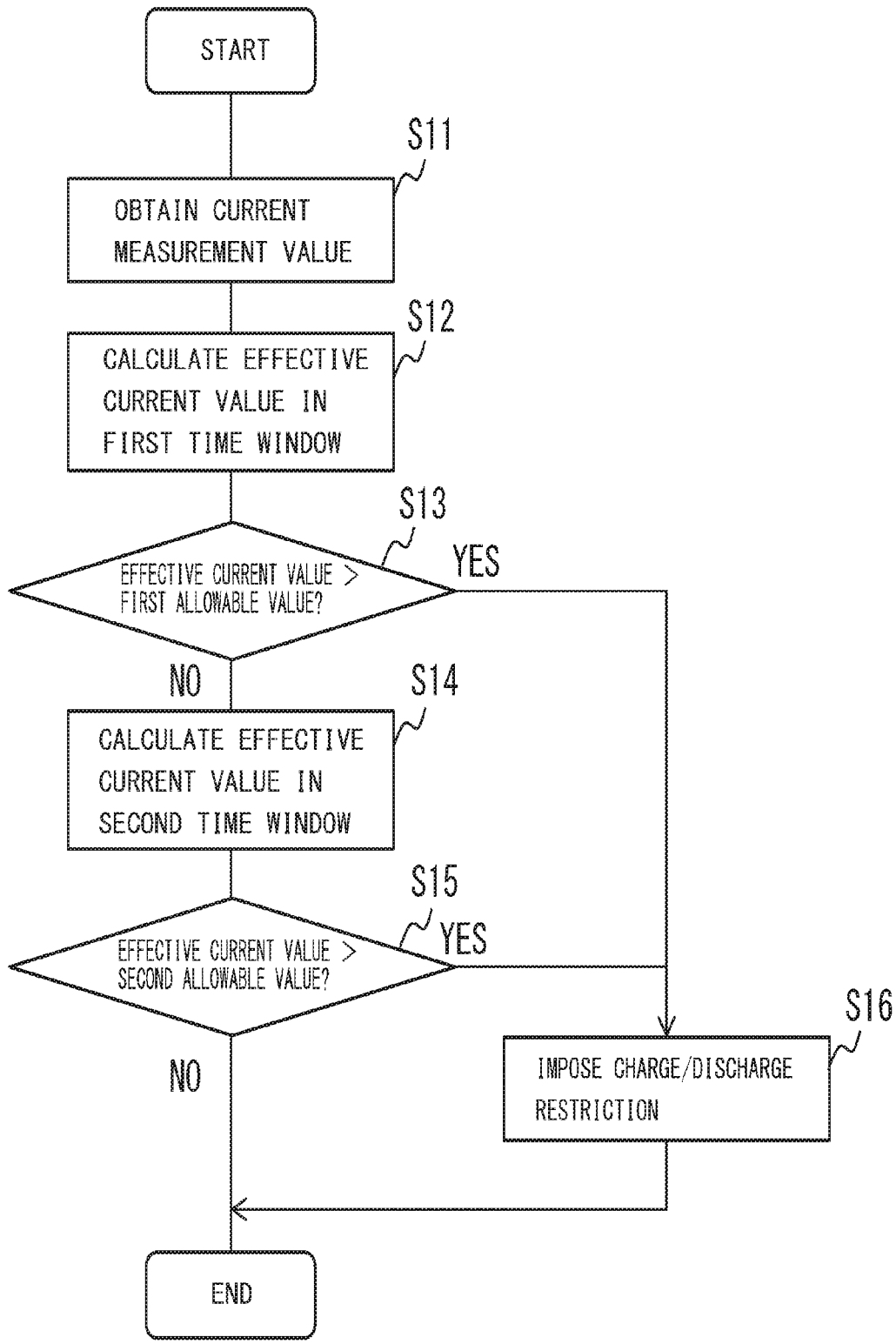

Of charge/discharge restrictions imposed over two phases, as described above, the first-phase charge/discharge restriction is imposed through the processing executed as shown in the flowchart presented in FIG. 6. The processing in the flowchart is executed in the assembled battery control unit 150 in each predetermined processing cycle.

In step S11, the assembled battery control unit 150 obtains the current measurement value from the current detection unit 130. A current measurement value, which is output from the current detection unit 130 after each predetermined sampling interval, is obtained and stored in this step.

In step S12, the assembled battery control unit 150 engages the effective current value calculation unit 151 in operation so as to calculate an effective current value in a first time window based upon the current measurement value having been obtained in step S11. The length of the first time window may be, for instance, 10 minutes, and in such a case, the effective current value for the first time window can be calculated by determining the mean square value of the individual current measurement values obtained over the predetermined sampling intervals during the most recent 10-minute period and calculating the square root of the mean square value.

In step S13, the assembled battery control unit 150 engages the charge/discharge restriction unit 153 in operation so as to compare the effective current value having been calculated in step S12 with a predetermined first allowable value. In this step, a decision is made as to whether or not the effective current value calculated for the first time window is greater than the first allowable value set at, for instance, 50 A. If it is decided that the effective current value is equal to or less than the first allowable value (50 A), the operation proceeds to step S14, whereas if it is greater than the first allowable value, the operation proceeds to step S16.

It is to be noted that if the length of time having elapsed since step S12 was last executed is less than the length of the first time window, the operation may proceed directly to step S14 by skipping the processing in step S12 and step S13 described above.

In step S14, the assembled battery control unit 150 engages the effective current value calculation unit 151 in operation so as to calculate an effective current value in a second time window based upon the current measurement value having been obtained in step S11. The length of the second time window may be, for instance, 1 hour, and in such a case, the effective current value for the second time window can be calculated based upon the individual current measurement values obtained over the predetermined sampling intervals during the most recent one-hour period through a method similar to that used in step S12.

In step S15, the assembled battery control unit 150 engages the charge/discharge restriction unit 153 in operation so as to compare the effective current value having been calculated in step S14 with a predetermined second allowable value. In this step, a decision is made as to whether or not the effective current value calculated for the second time window is greater than the second allowable value set at, for instance, 30 A. If it is decided that the effective current value is equal to or less than the second allowable value (30 A), the processing in the flowchart presented in FIG. 6 ends. However, if the effective current value is greater than the second allowable value, the operation proceeds to step S16.

It is to be noted that if the length of time having elapsed since step S14 was last executed is less than the length of the second time window, the processing in the flowchart presented in FIG. 6 may end immediately by skipping the processing in step S14 and step S15 described above.

In step S16, the assembled battery control unit 150 engages the charge/discharge restriction unit 153 in operation in order to impose a charge/discharge restriction on the assembled battery 110. In more specific terms, control is executed so as to ensure that the input/output power at the assembled battery 110 during the charge/discharge operation remains equal to or less than an allowable electric power value by determining the allowable power value corresponding to the charge/discharge current subjected to the restriction and outputting the value thus determined to the vehicle control unit 200 and to the battery cell control units 121a and 121b. It is to be noted that the charge/discharge current subjected to the restriction should take a value lower than both the first allowable value and the second allowable value mentioned earlier. Once step S16 has been executed, the assembled battery control unit 150 ends the processing in the flowchart presented in FIG. 6.

Through the processing executed by the assembled battery control unit 150 as described above, the first-phase charge/discharge restriction can be imposed on the assembled battery 110. It is to be noted that the first-phase charge/discharge restriction having been imposed as described above can be cleared if negative decisions are made both in step S13 and in step S15 in a subsequent processing cycle.

Figure 7:
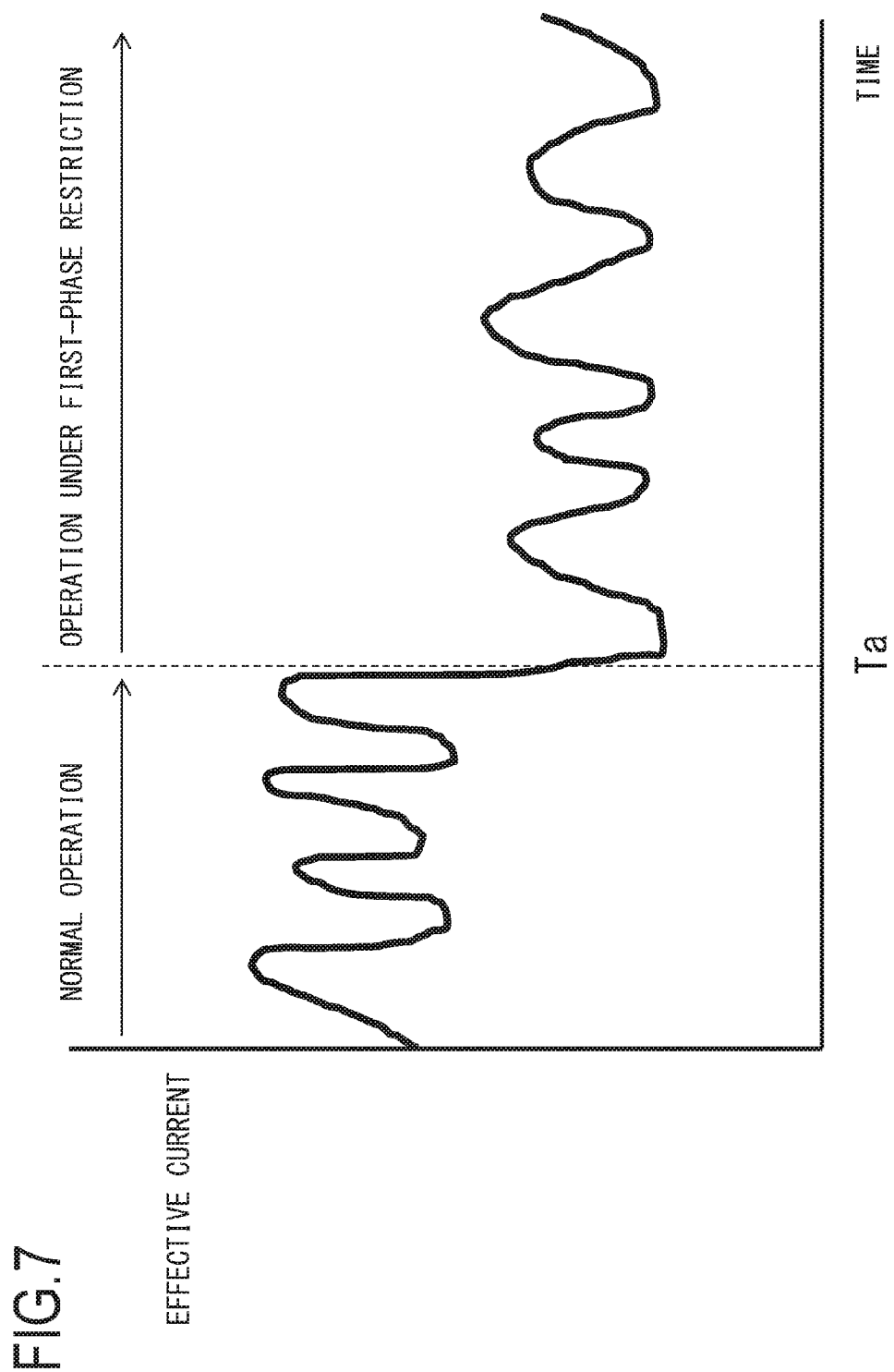

FIG. 7 presents a diagram illustrating how the effective current may change when the first-phase charge/discharge restriction is imposed. As FIG. 7 indicates, the effective current value remains relatively high over the period of time leading up to a time point Ta, during which no charge/discharge restriction is imposed and the assembled battery 110 is utilized in a normal manner. Once the first-phase charge/discharge restriction is imposed at the time point Ta, the effective current is sustained at low levels.

Figure 8:
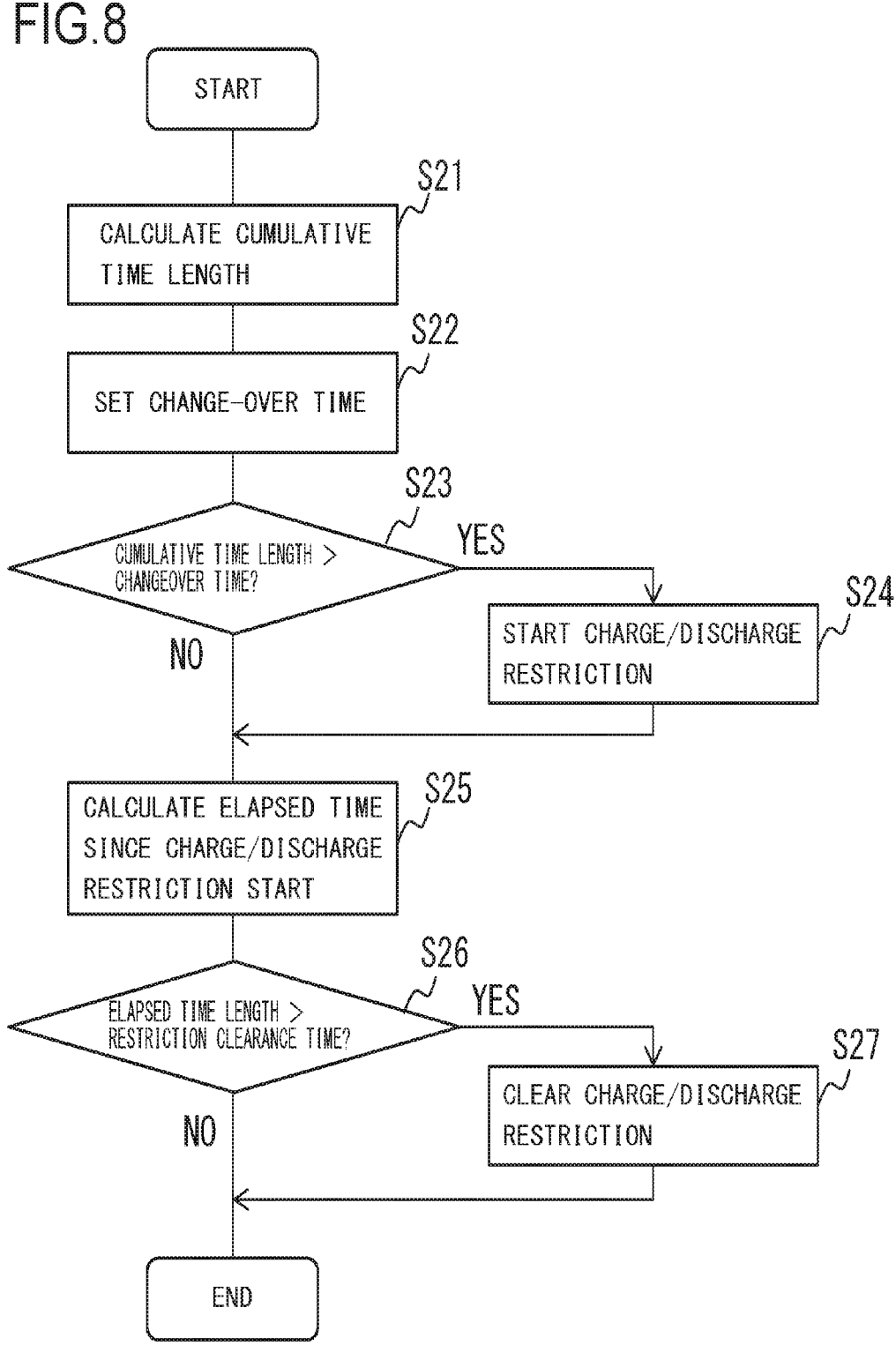

Of the charge/discharge restrictions imposed over two phases as described above, the second phase charge/discharge restriction is imposed through the processing executed as shown in the flowchart presented in FIG. 8. The processing in the flowchart is executed in the assembled battery control unit 150 in each predetermined processing cycle.

In step S21, the assembled battery control unit 150 engages the cumulative time length calculation unit 152 in operation in order to calculate the cumulative length of time over which the effective current value has been in excess of the allowable value. In this step, the cumulative time length may be calculated through the method described below.

FIG. 9 presents a chart in reference to which the cumulative time length calculation method will be explained. FIG. 9 presents an example of decision-making results that may have been obtained through step S15 in FIG. 6, having been executed every hour over a time period starting 24 hours previously and leading up to the current time, assuming that the second time window mentioned earlier extends over one hour.

If the effective current value calculated for the second time window exceeds the second allowable value and thus an affirmative decision is made in step S15, an "X" is entered in the corresponding field in the table in FIG. 9. Namely, the table presented in FIG. 9 indicates that the effective current value calculated for the time window has been in excess of the second allowable value in the processing executed two hours previously, four hours previously, five hours previously, 23 hours previously and 24 hours previously. It is to be noted that if the vehicle system is turned off and the battery control system 120 is in a non-operating state, no entry is made in the corresponding field in the table in FIG. 9.

In step S21 in FIG. 8, the cumulative length of time over which the effective current value has been in excess of the allowable value can be calculated by counting the number of fields where "X" has been entered in the table in FIG. 9. Namely, in the example presented in FIG. 9, the number of fields where "X" is entered is five, and accordingly, the length of time over which the effective current value has been in excess of the allowable value can be calculated to be five hours.

It is to be noted that the cumulative time length calculation method described above simply represents an example and the cumulative time length may be calculated through another method. For instance, the cumulative time length may otherwise be calculated by recording the effective current values calculated through step S12 or step S14 in FIG. 6, counting the number of values exceeding the corresponding allowable value and multiplying the count by the length of the time window.

In step S22 in FIG. 8, the assembled battery control unit 150 engages the charge/discharge restriction unit 153 in operation so as to set a changeover time to be used as a threshold value for the cumulative time length calculated in step S21. In this step, the change-over time may be set as described below based upon the effective current values calculated through step S12 and step S14 in FIG. 6.

FIG. 10 presents a chart in reference to which the changeover time setting method will be explained. FIG. 10, assuming the form of a table, presents an example of a relationship that may be achieved by the effective current values calculated for the first time window extending over 10 minutes and for the second time window extending over one hour and the change-over time.

The table presented in FIG. 10 indicates that when the effective current values calculated for the most recent first and second time windows are both less than the respective allowable values of 50 A and 30 A, the change-over time used for the decision-making in step S22 in FIG. 8 can be set to five hours. Likewise, when the effective current values calculated for the most recent first and second time windows are both less than the values of 55 A and 33 A respectively, the change-over time can be set to four hours. The changeover time can be set in correspondence to any other effective current values based upon the table presented in FIG. 10.

It is to be noted that the changeover time setting method described above simply represents an example and that changeover time may be set by adopting an alternative method. For instance, the changeover time may be set based upon the effective current values having been calculated for the time windows in a plurality of past processing cycles, instead of the most recent effective current values. In addition, the change-over time may be set either based upon either the effective current value in the first time window or the effective current value in the second time window.

In step S23 in FIG. 8, the assembled battery control unit 150 engages the charge/discharge restriction unit 153 in operation so as to compare the cumulative time length having been calculated in step S21 with the changeover time having been set in step S22. If the comparison results indicate that the cumulative time length is greater than the change-over time, the operation proceeds to step S24, whereas if they indicate that the cumulative time length is equal to or less than the change-over time, the operation proceeds to step S25.

In step S24, the assembled battery control unit 150 engages the charge/discharge restriction unit 153 in operation so as to impose a charge/discharge restriction on the assembled battery 110. In more specific terms, control is executed so as to ensure that the input/output power at the assembled battery 110 during the charge/discharge operation remains equal to or less than an allowable electric power value by determining the allowable power value corresponding to the charge/discharge current subjected to the restriction and outputting the value thus determined to the vehicle control unit 200 and to the battery cell control units 121a and 121b, as in the processing executed in step S16 in FIG. 6 described earlier. It is to be noted that the charge/discharge current subjected to the restriction should take a value lower than the charge/discharge current having been subjected to the restriction in step S16. Once step S24 has been executed, the operation proceeds to step S25.

Through the processing executed as described above in steps S21 through S24 by the assembled battery control unit 150, the second-phase charge/discharge restriction can be imposed on the assembled battery 110. It is to be noted that the processing in steps S21 through S24 may be skipped if the second-phase charge/discharge restriction is already in effect through step S24 having been executed in a previous processing cycle.

FIG. 11 presents a diagram illustrating how the effective current may change when the first and second-phase charge/discharge restrictions are imposed. As FIG. 11 indicates, the effective current value remains relatively high over the period of time leading up to a time point Tb, during which no charge/discharge restriction is imposed and the assembled battery 110 is utilized in a normal manner. Once the first-phase charge/discharge restriction is imposed at the time point Tb, the effective current is sustained at low levels. Then, after the second-phase charge/discharge restriction is imposed at a subsequent time point Tc, the effective current is sustained at even lower levels.

In step S25 in FIG. 8, the assembled battery control unit 150 engages the charge/discharge restriction unit 153 in operation so as to calculate the length of time having elapsed since the charge/discharge restriction came into effect in step S24. In this step, a built-in timer in the assembled battery control unit 150, for instance, may be used to calculate the length of time having elapsed since the charge/discharge restriction came into effect. As an alternative, information indicating the length of time having elapsed since the charge/discharge restriction came into effect may be obtained from the vehicle control unit 200 in FIG. 1 through communication carried out via the CAN mentioned earlier and the length of elapsed time may be calculated based upon the information thus obtained. If there has been a period of time following the imposition of the charge/discharge restriction over which the vehicle system has been off and the battery control system 120 has remained in a non-operating state, it is desirable that the length of elapsed time calculated in this step include this period.

In step S26, the assembled battery control unit 150 engages the charge/discharge restriction unit 153 in operation so as to compare the length of elapsed time having been calculated in step S25 with a predetermined restriction clearance time. The restriction clearance time may be set to, for instance, 12 hours, and in such a case, a decision is made as to whether or not the length of time having elapsed since the charge/discharge restriction came into effect in step S24 is greater than 12 hours. If the decision-making results indicate that the length of time having elapsed since the charge/discharge came into effect restriction is equal to or less than the restriction clearance time (12 hours), the processing in the flowchart presented in FIG. 8 ends. However, if the length of elapsed time is greater than the restriction clearance time, the operation proceeds to step S27.

In step S27, the assembled battery control unit 150 engages the charge/discharge restriction unit 153 in operation so as to clear the charge/discharge restriction on the assembled battery 110, having come into effect in step S24. In more specific terms, it executes control so as to restore the initial setting for the allowable electric power with regard to the input/output power at the assembled battery 110 during the charge/discharge operation by outputting the allowable electric power value in place before the charge/discharge restriction started in step S24 to the vehicle control unit 200 and to the battery cell control units 121a and 121b. Once step S27 has been executed, the assembled battery control unit 150 ends the processing in the flowchart presented in FIG. 8.

Through the processing executed as described above in steps S25 through S27 by the assembled battery control unit 150, the second-phase charge/discharge restriction imposed on the assembled battery 110 can be cleared. It is to be noted that the processing in steps S25 through S27 may be skipped if the second-phase charge/discharge restriction is not currently in effect.

FIG. 12 is a diagram showing how the effective current may change when the second-phase charge/discharge restriction is cleared. As FIG. 12 indicates, the effective current is lowered with the second-phase charge/discharge restriction imposed at a time point Td, and then, as the battery control system 120 enters an OFF state at a time point Te, the effective current is further reduced to 0. In addition, once 12 hours have elapsed since the time point Td, the charge/discharge restriction is cleared at a subsequent time point Tf with the effective current rises again.

The following operations and advantages are achieved through the embodiment of the present invention described above.

(1) The battery control system 120 is connected to an assembled battery 110 and controls charge/discharge at the assembled battery 110. The battery control system 120 comprises a current detection unit 130 that measures a current value by detecting an electric current flowing through the assembled battery 110, a voltage detection unit 140 that detects a voltage at the assembled battery 110, a temperature detection unit 125 that detects a temperature at the assembled battery 110 and an assembled battery control unit 150. The assembled battery control unit 150 has functions fulfilled in the form of an effective current value calculation unit 151 that calculates, based upon the current value measured by the current detection unit 130, an effective current value in a predetermined time window, and a charge/discharge restriction unit 153 that imposes a first charge/discharge restriction to restrict the charge/discharge current based upon the effective current value calculated by the effective current value calculation unit 151. Through this system, any decrease in the performance level of the assembled battery 110 can be prevented with a high level of reliability by restricting the charge/discharge current based upon the effective current value even when the assembled battery 110 is sustained continuously in a charge/discharge state while the charge/discharge current changes continuously.

(2) The effective current value calculation unit 151 calculates the effective current value in a first time window (step S12) and also calculates the effective current value in a second time window different from the first time window (step S14). In other words, it individually calculates effective current values in two time windows. Based upon these effective current values, the charge/discharge restriction unit 153 imposes the first charge/discharge restriction (steps S13, S15 and S16). As a result, the first charge/discharge restriction can be imposed with a high level of reliability under optimal conditions by factoring in an allowable value for the effective current that changes from one time window to another.

(3) The assembled battery control unit 150 further has a function fulfilled in the form of a cumulative time length calculation unit 152 that calculates a cumulative time length expressed as a cumulative value for the length of time over which the effective current value has been in excess of a predetermined allowable value. Based upon the cumulative time length calculated by the cumulative time length calculation unit 152 (step S21), the charge/discharge restriction unit 153 imposes a second charge/discharge restriction so as to further restrict the charge/discharge current (steps S23 and S24). Through this process, any decrease in the performance level of the assembled battery 110, which might otherwise occur when a large charge/discharge current flows intermittently over a longer period of time even as a flow of a large charge/discharge current is inhibited through the first charge/discharge restriction on a short-term basis, can be prevented.

(4) The charge/discharge restriction unit 153 sets a threshold value for the cumulative time length in correspondence to the effective current value (step S22). In step S23, the cumulative time length is compared with the threshold value and based upon the comparison results, the second charge/discharge restriction is imposed in step S24. Through these measures, an optimal decision can be made with regard to whether or not the second charge/discharge restriction is to be imposed in correspondence to the effective current value.

(5) When the length of time having elapsed since the second charge/discharge restriction came into effect becomes greater than a predetermined restriction clearance time, the charge/discharge restriction unit 153 clears the second charge/discharge restriction (steps S25 through S27). As a result, after the second charge/discharge restriction is imposed, the initial state can be restored by clearing the second charge/discharge restriction with optimal timing.

(6) The battery control system 120 is connected to a CAN, i.e., an in-vehicle communication network. The charge/discharge restriction unit 153 is thus able to obtain information pertaining to the elapsed time length via the CAN as well. This means that the second charge/discharge restriction can be cleared with optimal timing even if the battery control system 120 does not have a timer function.

It is to be noted that some or all of the control blocks in the assembled battery control unit 150 shown in FIG. 5, which are involved in the charge/discharge restrictions, may be allocated in the vehicle control unit 200. For instance, the function of the effective current value calculation unit 151 may be fulfilled at the assembled battery control unit 150 and the functions of the cumulative time length calculation unit 152 and the charge/discharge restriction unit 153 may be fulfilled at the vehicle control unit 200. In such a case, the assembled battery control unit 150 transmits information indicating the effective current value calculated by the effective current value calculation unit 151 to the vehicle control unit 200. The vehicle control unit 200 uses the information on the effective current value having been transmitted by the assembled battery control unit 150 so as to calculate, via the cumulative time length calculation unit 152, the cumulative length of time over which the effective current value has been in excess of the allowable value. In addition, based upon the effective current value having been transmitted by the assembled battery control unit 150 and the cumulative time length calculated by the cumulative time length calculation unit 152, the charge/discharge restriction unit 153 is engaged in operation to make a decision as to whether or not to impose the first charge/discharge restriction or the second charge/discharge restriction, and then an instruction for the charge/discharge restriction is issued for the battery control system 120 in correspondence to the decision-making results. Through these alternative measures, operations and advantages similar to those having been described earlier can be achieved.

The lengths of the time windows for the effective current value calculation, the allowable values to be compared with the calculated effective current values and the like used in the first-phase charge/discharge restriction processing in the embodiment described above simply represent examples, and the present invention may be adopted in conjunction with other values. In addition, while effective current values are calculated for two different time windows in the embodiment described above, an effective current value may be calculated only for a single time window and in such a case, the processing in steps S14 and S15 in FIG. 6 may be omitted. As an alternative, effective current values may be calculated for three or more time windows, the effective currents values may each be compared with a specific allowable value selected for the corresponding time window and a decision as to whether or not to impose the charge/discharge restriction may be made. For instance, any number of time windows extending over time lengths within a range of 10 seconds through eight hours may be selected, effective current values may be calculated each in correspondence to one of the time windows and the first-phase charge/discharge restriction may be imposed based upon the results obtained by comparing the effective current values with the respective allowable values.

In addition, the length of time set for the cumulative time length calculation, the length of change-over time set as a threshold value for the calculated cumulative time length, the length of restriction clearance time and the like used in the second-phase charge/discharge restriction processing executed in the embodiment described above simply represent examples, and the present invention may be adopted in conjunction with other values. Furthermore, while the length of time having elapsed since the second-phase charge/discharge restriction came into effect is calculated and a decision is made as to whether or not to clear the second-phase charge/discharge restriction by comparing the length of elapsed time with the restriction clearance time in the embodiment described above, a decision as to whether or not to clear the second-phase charge/discharge restriction may be made by calculating a total length of time over which the second-phase charge/discharge restriction has been in effect and comparing this total length of time with the restriction clearance time. In this case, if there has been a period of time since the charge/discharge restriction came into effect, over which the vehicle system has been turned off and the battery control system 120 has been, therefore, in a non-operating state, it is desirable to calculate the total length of time by excluding this period.

It is to be noted that the present invention is in no way limited to the particulars of the embodiment and variations thereof described above, and any other mode conceivable within the technical range of the present invention should be considered to be within the scope of the present invention.

In addition, all or some of the various structural elements and the various functions described above may be achieved in hardware by using, for instance, an integrated circuit or as a program or software executed by a processor. Information such as a program, a table and the like, needed to enable the various functions, may be stored in a storage device such as a memory or a hard disk, or in a storage medium such as an IC card or a DVD.

The disclosure of the following priority application is herein incorporated by reference: Japanese Patent Application No. 2013-166799, filed Aug. 9, 2013

REFERENCE SIGNS LIST

100: battery system, 110: assembled battery, 111: battery cell, 112a, 112b: battery cell group, 120: battery control system, 121a, 121b: battery cell control unit, 122: voltage detection unit, 123: control circuit, 124: signal input/output circuit, 125: temperature detection unit, 130: current detection unit, 140: voltage detection unit, 150: assembled battery control unit, 151: effective current value calculation unit, 152: cumulative time length calculation unit, 153: charge/discharge restriction unit, 160: signal communication path, 170: insulator element, 180: storage unit, 200: vehicle control unit, 300, 310, 320, 330: relay, 400: inverter, 410: motor generator, 420: charger

The invention claimed is:

1. A battery control system connected to a battery, which controls charge/discharge at the battery, comprising:
    a current sensor that measures a current value by detecting a charge/discharge current flowing through the battery;
    a voltage sensor that detects a voltage at the battery;
    a temperature sensor that detects a temperature at the battery;
    a processor communicatively coupled to the current sensor, the voltage sensor and the temperature sensor, wherein the processor:
    calculates, a first effective current value based on the current measured by the current sensor in a first predetermined time window,
    compares the first effective current value to first predetermined allowable value to determine whether the first effective current value is in excess of the first predetermined allowable value,
    on a condition that the first effective current value is in excess of the first predetermined allowable value, imposes a first charge/discharge restriction, and
    on a condition that the first effective current value is not in excess of the first predetermined allowable value:
        calculates a second effective current value based on the current measured by the current sensor during a second predetermined time window, wherein the second predetermined time window is longer than the first predetermined time window;
        compares the second effective current value to a second predetermined allowable value to determine whether the second effective current value is in excess of the second predetermined allowable value; and
        on a condition that the second effective current value exceeds the second predetermined allowable value, imposes a second charge/discharge restriction;
    wherein the first charge/discharge restriction so as to restrict an allowable value of the charge/discharge current to a predetermined first current value based upon the effective current value calculated by the effective current value calculation unit; and
    wherein the second-charge/discharge restriction includes:
        measuring a cumulative time that represents a length of time over which the second effective current value has been in excess of the second predetermined allowable value,
        determining a changeover time based on the first effective current value and the second effective current value,
        on a condition that the cumulative time exceeds the changeover time restricts the allowable value of the charge/discharge current to a predetermined second current value, which is smaller than the first current value and larger than zero.

2. The battery control system according to claim 1, wherein:
    the second charge/discharge restriction further includes:
    clearing, once a length of elapsed time since the second charge/discharge restriction came into effect or a total length of time over which the second charge/discharge restriction has been in effect exceeds a predetermined restriction clearance time.

3. The battery control system according to claim 2, wherein:
    the battery control system is connected to an in-vehicle communication network; and
    the processor further obtains information pertaining to the length of elapsed time or the total length of time via the communication network.

4. A vehicle control system, comprising:
    a vehicle control unit communicatively coupled to the battery control system according to claim 1.

* * * * *